US010295820B2

(12) United States Patent
Small et al.

(10) Patent No.: US 10,295,820 B2
(45) Date of Patent: May 21, 2019

(54) METHOD OF PROCESSING CALIBRATION DATA IN 3D LASER SCANNER SYSTEMS

(71) Applicant: nLIGHT, Inc., Vancouver, WA (US)

(72) Inventors: Jay Small, Vancouver, WA (US); Ken Gross, Vancouver, WA (US); Vito P. Errico, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/410,612

(22) Filed: Jan. 19, 2017

(65) Prior Publication Data

US 2017/0205623 A1 Jul. 20, 2017

Related U.S. Application Data

(60) Provisional application No. 62/280,668, filed on Jan. 19, 2016, provisional application No. 62/344,988, filed on Jun. 3, 2016, provisional application No. 62/401,775, filed on Sep. 29, 2016.

(51) Int. Cl.
   *G02B 26/10* (2006.01)
   *G01B 11/00* (2006.01)

(52) U.S. Cl.
   CPC .......... *G02B 26/105* (2013.01); *G01B 11/005* (2013.01); *G02B 26/101* (2013.01)

(58) Field of Classification Search
   None
   See application file for complete search history.

(56) References Cited

U.S. PATENT DOCUMENTS

| 3,388,461 A | 6/1968 | Lins |
| 4,713,518 A | 12/1987 | Yamazaki et al. |
| 4,863,538 A | 9/1989 | Deckard |

(Continued)

FOREIGN PATENT DOCUMENTS

| CN | 1217030 C | 8/2005 |
| CN | 1926460 | 3/2007 |

(Continued)

OTHER PUBLICATIONS

Michael Kummer, Method to quantify accuracy of position feedback signals of a three-dimensional two-photon laser-scanning microscope, published Sep. 1, 2015, p. 3678-2693, © 2015 Optical Society of America.*

(Continued)

*Primary Examiner* — Tung S Lau
(74) *Attorney, Agent, or Firm* — Klarquist Sparkman, LLP

(57) ABSTRACT

A method includes determining a set of pattern position errors between (i) a set of expected pattern positions of a calibration pattern on a laser target situated in a laser processing field of a laser system and produced based on a set of initial scan optic actuation corrections associated with a scan optic of the laser system and (ii) a set of measured pattern positions of the calibration pattern, determining a set of scan optic actuation rates based on the set of initial scan optic actuation corrections, and updating the set of initial scan optic actuation corrections based on the set of scan optic actuation rates and the set of pattern position errors so as to form a set of updated scan optic actuation corrections that is associated with a reduction of at least a portion of the set of pattern position errors.

13 Claims, 7 Drawing Sheets

(56) References Cited

U.S. PATENT DOCUMENTS

| | | | |
|---|---|---|---|
| 4,953,947 A | 9/1990 | Bhagavatula | |
| 5,008,555 A | 4/1991 | Mundy | |
| 5,082,349 A | 1/1992 | Cordova-Plaza et al. | |
| 5,252,991 A | 10/1993 | Storlie et al. | |
| 5,509,597 A | 4/1996 | Laferriere | |
| 5,523,543 A | 6/1996 | Hunter, Jr. et al. | |
| 5,566,196 A | 10/1996 | Scifres | |
| 5,642,198 A | 6/1997 | Long | |
| 5,719,386 A | 2/1998 | Hsieh et al. | |
| 5,841,465 A * | 11/1998 | Fukunaga | B41J 2/471 347/258 |
| 5,932,119 A | 8/1999 | Kaplan et al. | |
| 6,353,203 B1 | 3/2002 | Hokodate et al. | |
| 6,362,004 B1 | 3/2002 | Noblett | |
| 6,426,840 B1 | 7/2002 | Partanen et al. | |
| 6,434,302 B1 | 8/2002 | Fidric et al. | |
| 6,490,376 B1 | 12/2002 | Au et al. | |
| 6,577,314 B1 | 6/2003 | Yoshida et al. | |
| 7,151,788 B2 | 12/2006 | Imakado et al. | |
| 7,349,123 B2 | 3/2008 | Clarke et al. | |
| 7,622,710 B2 | 11/2009 | Gluckstad | |
| 7,628,865 B2 | 12/2009 | Singh | |
| 7,781,778 B2 | 8/2010 | Moon et al. | |
| 8,071,912 B2 | 12/2011 | Costin, Sr. et al. | |
| 8,237,788 B2 | 8/2012 | Cooper et al. | |
| 8,251,475 B2 | 8/2012 | Murray et al. | |
| 8,269,108 B2 | 9/2012 | Kunishi et al. | |
| 8,288,679 B2 | 10/2012 | Unrath | |
| 8,310,009 B2 | 11/2012 | Saran et al. | |
| 8,404,998 B2 | 3/2013 | Unrath et al. | |
| 8,414,264 B2 | 4/2013 | Bolms et al. | |
| 8,415,613 B2 | 4/2013 | Heyn et al. | |
| 8,442,303 B2 | 5/2013 | Cheng et al. | |
| 8,472,099 B2 | 6/2013 | Fujino et al. | |
| 8,809,734 B2 | 8/2014 | Cordingley et al. | |
| 9,496,683 B1 | 11/2016 | Kanskar | |
| 9,537,042 B2 | 1/2017 | Dittli et al. | |
| 2001/0050364 A1 | 12/2001 | Tanaka et al. | |
| 2003/0174387 A1 | 9/2003 | Eggleton et al. | |
| 2003/0213998 A1 | 11/2003 | Hsu et al. | |
| 2004/0031779 A1 | 2/2004 | Cahill et al. | |
| 2004/0112634 A1 | 6/2004 | Tanaka et al. | |
| 2004/0207936 A1 | 10/2004 | Yamamoto et al. | |
| 2005/0168847 A1 | 8/2005 | Sasaki | |
| 2005/0191017 A1 | 9/2005 | Croteau et al. | |
| 2005/0233557 A1 | 10/2005 | Tanaka et al. | |
| 2006/0275705 A1 | 12/2006 | Dorogy et al. | |
| 2007/0075060 A1 | 4/2007 | Shedlov et al. | |
| 2007/0251543 A1 | 11/2007 | Singh | |
| 2008/0231939 A1 | 9/2008 | Gluckstad | |
| 2008/0246024 A1 | 10/2008 | Touwslager et al. | |
| 2009/0122377 A1 | 5/2009 | Wagner | |
| 2009/0274833 A1 | 11/2009 | Li | |
| 2009/0297140 A1 | 12/2009 | Heismann et al. | |
| 2009/0314752 A1 | 12/2009 | Manens et al. | |
| 2009/0324233 A1 | 12/2009 | Samartsev et al. | |
| 2010/0025387 A1 | 2/2010 | Arai et al. | |
| 2010/0225974 A1 | 9/2010 | Sandstrom | |
| 2010/0230665 A1 | 9/2010 | Verschuren et al. | |
| 2010/0251437 A1 | 9/2010 | Heyn et al. | |
| 2010/0252543 A1 | 10/2010 | Manens et al. | |
| 2011/0080476 A1 | 4/2011 | Dinauer et al. | |
| 2011/0127697 A1 | 6/2011 | Milne | |
| 2011/0133365 A1 | 6/2011 | Ushimaru et al. | |
| 2011/0187025 A1 | 8/2011 | Costin, Sr. | |
| 2011/0278277 A1 | 11/2011 | Stork Genannt Wersborg | |
| 2011/0279826 A1 | 11/2011 | Miura et al. | |
| 2012/0127097 A1 | 5/2012 | Gaynor et al. | |
| 2012/0145685 A1 | 6/2012 | Ream et al. | |
| 2012/0148823 A1 | 6/2012 | Chu | |
| 2012/0156458 A1 | 6/2012 | Chu | |
| 2012/0295071 A1 | 11/2012 | Sato | |
| 2012/0301733 A1 | 11/2012 | Eckert et al. | |
| 2012/0301737 A1 | 11/2012 | Labelle et al. | |
| 2013/0005139 A1 | 1/2013 | Krasnov et al. | |
| 2013/0022754 A1 | 1/2013 | Bennett et al. | |
| 2013/0023086 A1 | 1/2013 | Chikama et al. | |
| 2013/0027648 A1 | 1/2013 | Moriwaki | |
| 2013/0095260 A1 | 4/2013 | Bovatsek et al. | |
| 2013/0134637 A1 | 5/2013 | Wiesner et al. | |
| 2013/0228442 A1 | 9/2013 | Mohaptatra et al. | |
| 2013/0299468 A1 | 11/2013 | Unrath et al. | |
| 2014/0104618 A1 | 4/2014 | Potsaid et al. | |
| 2014/0155873 A1 * | 6/2014 | Bor | A61F 9/00825 606/5 |
| 2014/0259589 A1 | 9/2014 | Xu et al. | |
| 2014/0319381 A1 | 10/2014 | Gross | |
| 2014/0332254 A1 | 11/2014 | Pellerite et al. | |
| 2014/0333931 A1 | 11/2014 | Lu et al. | |
| 2015/0165556 A1 | 6/2015 | Jones et al. | |
| 2015/0314612 A1 | 11/2015 | Balasini et al. | |
| 2015/0352664 A1 | 12/2015 | Enrico et al. | |
| 2016/0158889 A1 | 6/2016 | Carter et al. | |
| 2016/0187646 A1 * | 6/2016 | Ehrmann | G02B 13/0095 219/121.73 |
| 2016/0294150 A1 | 10/2016 | Johnson | |

FOREIGN PATENT DOCUMENTS

| | | |
|---|---|---|
| CN | 1966224 | 5/2007 |
| CN | 101836309 | 10/2007 |
| CN | 101143405 | 3/2008 |
| CN | 101303269 | 11/2008 |
| CN | 101314196 | 12/2008 |
| CN | 102448623 | 3/2009 |
| CN | 101733561 | 6/2010 |
| CN | 201783759 | 4/2011 |
| CN | 102084282 | 6/2011 |
| CN | 102176104 | 9/2011 |
| CN | 102207618 | 10/2011 |
| CN | 102301200 | 12/2011 |
| CN | 102441740 | 5/2012 |
| DE | 4437284 | 4/1996 |
| DE | 203 20 269 | 4/2004 |
| DE | 202016004237 | 8/2016 |
| DE | 102015103127 | 9/2016 |
| EP | 1238745 | 9/2002 |
| EP | 1974848 | 1/2008 |
| EP | 2587564 | 5/2013 |
| EP | 2642246 | 9/2013 |
| JP | H02220314 | 9/1990 |
| JP | 2006-098085 | 4/2006 |
| JP | 2006-106227 | 4/2006 |
| JP | 2008-281395 | 11/2008 |
| KR | 10-2011-0109957 | 10/2011 |
| RU | 2008742 | 2/1994 |
| RU | 2021881 | 10/1994 |
| TW | 553430 | 9/2003 |
| TW | 200633062 | 9/2006 |
| TW | I271904 | 1/2007 |
| TW | 200707466 | 2/2007 |
| TW | 201307949 | 2/2013 |
| WO | WO 1995/011100 | 4/1995 |
| WO | WO 1995/011101 | 4/1995 |
| WO | WO 2009/155536 | 12/2009 |
| WO | WO 2012/102655 | 8/2012 |

OTHER PUBLICATIONS

John P. Giannini, Anticipating, measuring, and minimizing MEMS mirror scan error to improve laser scanning microscopy's speed and accuracy, Oct. 3, 2017, 14 pages.*

PCI-6110, 1 page, printed Dec. 15, 2017*

Affine Transformation—from Wolfram MathWorld, http://mathworld.wolfram.com/AffineTransformation.html, downloaded Feb. 21, 2014, 2 pages.

Chung, "Solution-Processed Flexible Transparent Conductors Composed of Silver Nanowire Networks Embedded in Indium Tin Oxide Nanoparticle Matrices," Nano Research, 10 pages (Sep. 24, 2012).

Cui, et al., "Calibration of a laser galvanometric scanning system by adapting a camera model," *Applied Optics* 48(14):2632-2637 (Jun. 2009).

(56) References Cited

OTHER PUBLICATIONS

First Office Action from Chinese Application No. 201410455972.X, dated Jan. 26, 2016, 21 pages (with English translation).
First Office Action from Chinese Application No. 201480019324.8, dated Apr. 5, 2017, 20 pages (with English translation).
Gardner, "Precision Photolithography on Flexible Substrates," http://azorescorp.com/downloads/Articles/AZORESFlexSubstrate.pdf (prior to Jan. 30, 2013).
Grigoriyants et al., "Tekhnologicheskie protsessy lazernoy obrabotki," Moscow, izdatelstvo MGTU im. N.E. Baumana, p. 334 (2006).
International Search Report and Written Opinion for International Application No. PCT/US2013/060470, 7 pages, dated Jan. 16, 2014.
International Search Report and Written Opinion for International Application No. PCT/US2014/017841, 5 pages, dated Jun. 5, 2014.
International Search Report and Written Opinion for International Application No. PCT/US2014/017836, 6 pages, dated Jun. 10, 2014.
International Search Report and Written Opinion for International Application No. PCT/US2017/014182, 9 pages, dated Mar. 31, 2017.
International Search Report and Written Opinion for International Application No. PCT/US2016/063086, 6 pages, dated Mar. 23, 2017.
Java—Transform a triangle to another triangle—Stack Overflow, http://stackoverflow.com/questions/1114257/transform-a-triangle-to-another-triangle?lq=1, downloaded Feb. 21, 2014, 3 pages.
Ludtke, et al., "Calibration of Galvanometric Laser Scanners Using Statistical Learning Methods," *Bildverabeitung für die Medizin*, pp. 467-472 (Feb. 25, 2015).
Manakov, et al., "A Mathematical Model and Calibration Procedure for Galvanometric Laser Scanning Systems," *Vision, Modeling, and Visualization*, 8 pages (Jan. 2011).
Official Letter and Search Report from the Taiwan Intellectual Property Office for related Application No. 102139285, 21 pages, dated Jun. 13, 2016 (w/ Eng. translation.).
Official Letter and Search Report from the Taiwan Intellectual Property Office for related Application No. 103106020, 21 pages, dated Apr. 20, 2016 (w/ Eng. translation.).
Official Letter and Search Report from the Taiwan Intellectual Property Office for related Application No. 102139285, 8 pages, dated Nov. 21, 2016 (w/ Eng. translation.).
Official Letter and Search Report from Taiwan Application No. 103130968, dated Dec. 20, 2016, 16 pages (w/ Eng. translation).
Office Action (no English translation) for related Chinese Application No. 201480022179.9, 5 pages, dated Mar. 30, 2017.
Office Action (w/ Eng. translation) for related Korea Application No. 10-2014-0120247, dated Apr. 14, 2017, 11 pages.
Product Brochure entitled "3-Axis and High Power Scanning" by Cambridge Technology, 4 pages, downloaded Dec. 21, 2013.
Product Brochure supplement entitled "Theory of Operation" by Cambridge Technology, 2 pages, downloaded Dec. 21, 2013.
Search Report from the Taiwan Intellectual Property Office for related Application No. 102139285, dated Sep. 1, 2015 (w/ Eng. translation.).
Second Office Action from Chinese Application No. 201410455972.X, dated Nov. 22, 2016, 22 pages (w/ Eng. translation).
Website describing 3-Axis Laser Scanning Systems at http://www.camtech.com/index.php?option=com_content&view=article&id=131&Itemid=181, 4 pages, accessed Dec. 31, 2014.
Second Office Action from Chinese Application No. 201480019324.8, dated Nov. 16, 2017, 21 pages (with English translation).
Second Office Action from Chinese Application No. 201380075745.8, dated Feb. 26, 2018, 6 pages (with English translation).
International Search Report and Written Opinion for International Application No. PCT/US2018/026110, 12 pages, dated Aug. 8, 2018.
Notice of Preliminary Rejection from the Korean Intellectual Property Office for related Application No. 10-2015-7025813, dated Jun. 26, 2018, 18 pages (with English translation).
Third Office Action from Chinese Application No. 201480019324.8, dated Apr. 13, 2018, 8 pages (with English translation).
Chen et al., "An Algorithm for correction of Distortion of Laser marking Systems," IEEE International Conference on Control and Automation, Guangzhou, China, 5 pages (May 30-Jun. 1, 2007).
Decision of Rejection (with English translation) from the Korean Intellectual Property Office for related Application No. 10-2015-7025813, 6 pages, dated Nov. 29, 2018.
Supplementary European Search Report for Application No. EP 17741945.4, 18 pages, dated Nov. 16, 2018.
Xie et al., "Correction of the image distortion for laser galvanometric scanning system," Optics & Laser Technology, 37:305-311 (Jun. 2005).
Official Letter and Search Report from Taiwan Application No. 103106020, dated Jun. 6, 2017, 7 pages (with English translation).
Office Action for related Chinese Application No. 201380075745.8, 21 pages, dated Jun. 2, 2017 (with English translation).
Search Report from the Taiwan Intellectual Property Office for related Application No. 102139285, 10 pages, dated Sep. 4, 2017 (with English translation).
Official Action for related Taiwan application No. 103130968 dated Jun. 7, 2017, 5 pages (with English translation).
Office Action for related Korea Application No. 10-2014-0120247, dated Oct. 18, 2017, 6 pages (with English translation).
Office Action for European Application No. EP 17741945.4, 7 pages, dated Jan. 9, 2019.
Office action from U.S. Appl. No. 14/768,595, dated Mar. 8, 2019, 8 pages.

* cited by examiner

METHOD OF PROCESSING CALIBRATION DATA IN 3D LASER SCANNER SYSTEMS

CROSS REFERENCE TO RELATED APPLICATION

This application claims the benefit of U.S. Provisional Patent Application Nos. 62/280,668, filed Jan. 19, 2016, 62/344,988, filed Jun. 23, 2016, and 62/401,775, filed Sep. 29, 2016, which are incorporated by reference herein in their entirety.

FIELD

The disclosure pertains to laser scanning field calibration.

BACKGROUND

As availability of high speed, high resolution galvanometric laser scanning systems has become more common and various laser processing applications for such systems have emerged, increased optical calibration performance of these systems has become increasingly demanding. Optical scanning devices typically include two generally orthogonal rotating mirrors, which require calibration in order to convert the mirror command angles into spatial target positions at a predetermined working distance or distances. High resolution applications can benefit from mirror actuator resolution of less than 10 µrad but such resolution can be difficult to achieve in practice due to poor calibration between the commanded beam position and actual beam position across a field of regard of the scanning system. Calibration problems are often compounded by errors associated with construction tolerances of the scanning systems and the position or orientation of an intended laser processing target after integration into the laser scanning system or application. Thus, a need remains for improved calibration methods that can achieve accuracy of a few µrad in laser scanning systems.

SUMMARY

In some examples of the disclosed technology, methods include determining a set of pattern position errors between (i) a set of expected pattern positions of a calibration pattern on a laser target situated in a laser processing field of a laser system and produced based on a set of initial scan optic actuation corrections associated with a scan optic of the laser system and (ii) a set of measured pattern positions of the calibration pattern, determining a set of scan optic actuation rates based on the set of initial scan optic actuation corrections, and updating the set of initial scan optic actuation corrections based on the set of scan optic actuation rates and the set of pattern position errors so as to form a set of updated scan optic actuation corrections that is associated with a reduction of at least a portion of the set of pattern position errors. In further examples, the set of scan optic actuation rates corresponds to a derivative of a surface function that describes the set of initial scan optic actuation corrections, and the updating of the set of initial scan optic actuation corrections includes evaluating the surface function derivative at a plurality of positions in the laser processing field and multiplying the respective surface function derivative values by the respective pattern position errors to define respective products and modifying the respective initial scan optic actuation corrections with the respective products.

In additional examples of the disclosed technology, apparatus include a laser source situated to generate at least one process beam, a scan system situated to receive the process beam and including one or more scan optics situated to direct the process beam to a position in a laser processing field associated with a target, and a controller coupled to the laser source and scan system and situated to direct the process beam in the laser processing field based on a set of scan optic actuation corrections determined from a set of scan optic actuation rates associated with a set of initial scan optic actuation corrections and from a set of pattern position errors corresponding to a difference between a set of expected pattern positions and a set of measured pattern positions with the set of measured pattern positions corresponding to process beam positions produced with the set of initial scan optic actuation corrections. In some examples, the controller includes at least one processor and one or more computer-readable storage media including stored instructions that, responsive to execution by the at least one processor, cause the controller to compare the set of measured pattern positions to the set of expected pattern positions to determine the set of pattern position errors, to curve fit the set of pattern position errors to a first function and to curve fit the set of initial scan optic actuation corrections to a second function, and to modify the set of initial actuation corrections based on the first function and a derivative function of the second function that corresponds to the set of scan optic actuation rates.

The foregoing and other features and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections.

Figure 1:
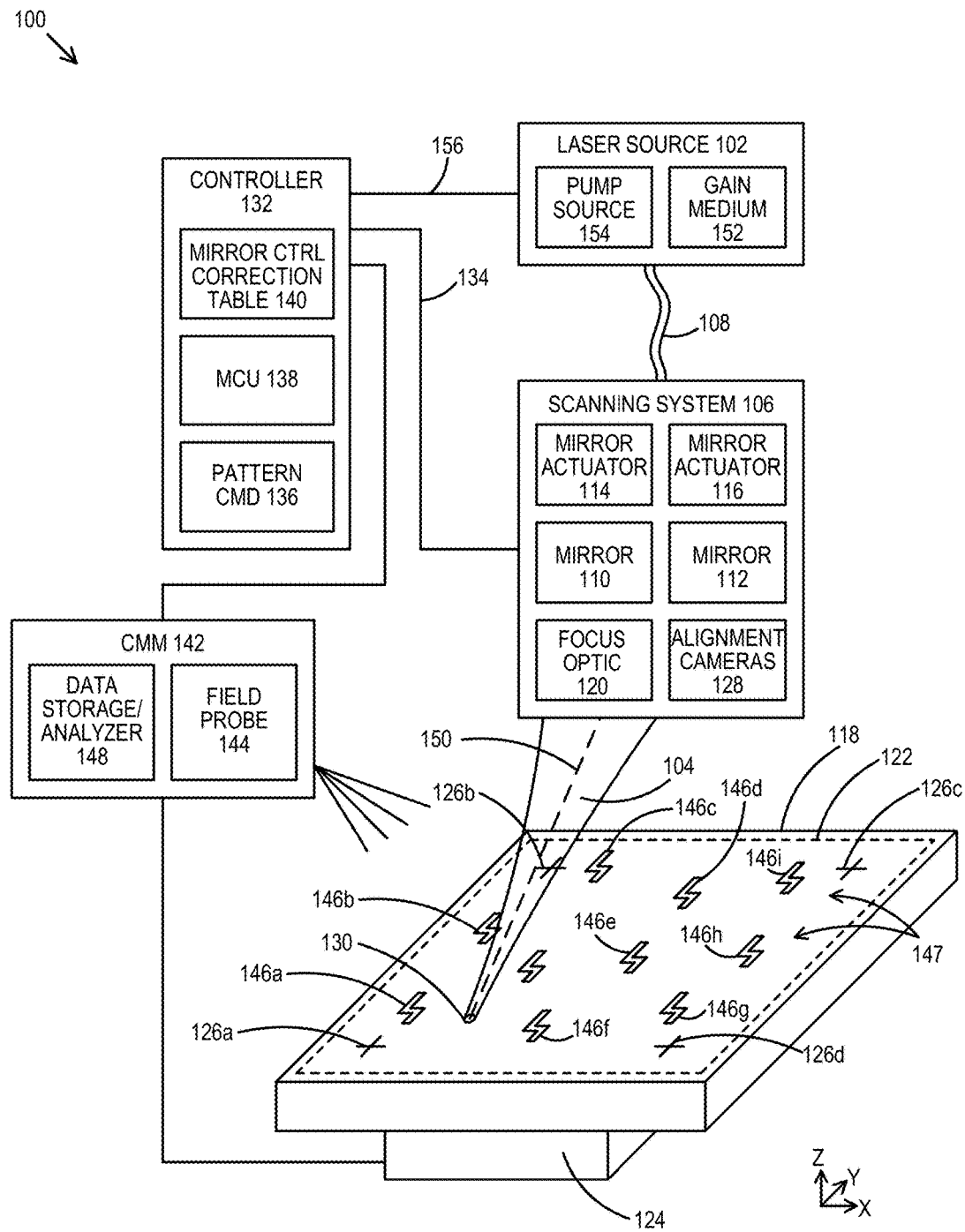
FIG. 1 illustrates a schematic of an example of a calibratable laser system.

In FIG. 1, an example of a laser system 100 is shown that includes a laser source 102 situated to produce a processing beam 104 that is optically coupled to a scanning system 106 through an optical fiber 108. In some examples, the scanning system 106 includes a galvanometer scanner that includes at least one scan optic, such as a pair of scan mirrors 110, 112 that rotate about respective scanning axes with mirror actuators 114, 116 so that the processing beam 104 can be directed to selected coordinate positions on a target 118 based on the rotations. The scanning system 106 typically includes a focusing system that includes a focus optic 120 situated to receive the processing beam 104 from the galvanometer scanner and to focus the processing beam 104 at the target 118 at the selected coordinate position associated with the angular position of the mirrors 110, 112. In some examples, the focus optic 120 is an f-theta lens that includes a suitably flat focus field at an image plane of the focus optics 120, corresponding to a surface at, adjacent to, or associated with the target 118. The various components of the scanning system 106, including the mirrors 110, 112, mirror actuators 114, 116, and focus optic 120, define a predetermined field of regard 122 over which the processing beam 104 can be scanned with a suitable level of accuracy, precision, and resolution with respect to commanded coordinates for the processing beam 104.

In some examples, the target 118 is movable with a translation stage 124 in various directions, such as linear or rotational, in relation to a propagation direction of the processing beam 104, including in a X direction, Y direction, Z direction or a combination of X, Y, or Z. In further examples, the translation stage 124 can include a conveyor system that translates the target 118 along a selected direction generally perpendicular to the processing beam 104 (such as X or Y). In various systems, the field of regard 122 has a rectangular or square shape, though it will be appreciated that other shapes are possible, including circular, oval, etc. In some conveyor systems, one or more edges of the field of regard 122 can extend parallel to the direction of conveyor movement. The target 118 can include one or more fiducials 126a-126d or other features so that that the target 118 can be aligned with respect to the field of regard 122, such as with one or more alignment cameras 128 situated to view portions of the field of regard 122 so as to detect the fiducials 126a-126d.

The focus optic 120 receives and focuses the processing beam 104 to a spot 130 at a position in the field of regard 122. A controller 132 is coupled to the scanning system 106 and is configured to send a command signal 134 based on a laser pattern command 136 to the mirror actuators 114, 116. The mirror actuators 114, 116 produce a corresponding rotation of the mirrors 110, 112, which produces a corresponding movement of the spot 130. In typical examples, the rotation of the mirrors 110, 112 can be commanded to various resolutions, including less than or equal to 100 μrad, 50 μrad, 20 μrad, 10 μrad, 5 μrad, 1 μrad, 0.5 μrad, or even 0.3 μrad, based on various signal capabilities associated with a microcontroller unit (MCU) 138 of the controller 132, such as 20 bit, 16 bit, 12 bit, 8 bit, etc. With the command signal 134 having a 20-bit bit depth and corresponding rotational resolution of less than 0.3 μrad, the field of regard 122 can be increased or the working distance between the scanning system 106 and the target 118 can be increased, or both, and sub-micron positional accuracy can be achieved at the working surface of the target 118 for various large field sizes. In one example, a one meter width of the field of regard 122 and a 20-bit command signal can correspond to 0.95 μm/bit resolution at the target 118 along the width direction (e.g., X, Y). The spot 130 of the processing beam 104 can have various sizes, including at focused or unfocused positions. For example, the scanning system 106 can include a beam expander that can increase the size of the spot 130 at the target 118 or the spot 130 can be defocused with a focus mechanism so that a larger defocused cross-section of the processing beam 104 is situated at the target 118.

In typical examples, the laser pattern command 136 includes X and Y coordinate positions where the processing beam 104 is positioned or moved in the field of regard 122 so as to laser process the target 118. To provide accuracy across the field of regard 122 between the laser pattern command 136 that corresponds to the expected positions of the laser pattern to be produced on the target 118 with the processing beam 104 and the actual positions of the laser pattern produced on the target 118 by the processing beam 104, the controller 132 includes a mirror control correction table 140 that provides bit quantities and corrections. Thus, the command signal 134 is generated by the controller 138 for a particular coordinate position in the field of regard 122 based on the corresponding bit quantity and correction in the mirror control correction table 140. The scan optics and other components of the scanning system 106 typically have a highly nonlinear relationship between internally commanded positions, such as the commanded rotational positions of the mirrors 110, 112, and the corresponding X and Y positions of the processing beam 104 in the field of regard 122.

A calibration process is provided that maps the positions of the scan optics, such as the mirrors 110, 112, throughout the field of regard 112 predictively to each field position. To determine position errors so that they can be reduced, a coordinate measurement machine (CMM) 142 that includes a field probe 144 can be optically coupled to the field of regard 122. A plurality of calibration pattern portions 146a-146i can be formed on the target 118 with the processing beam 104 to provide a calibration pattern 147 that can be detected by the field probe 144. The calibration pattern 147 can have various shapes, including linearly or periodically spaced grids of lines, dots, circles, arcs, functions, etc., nonlinear spaced grids, random or pseudorandom pattern shapes, etc., that correspond to a calibration pattern command. The CMM 142 can include one or more data storage or data analyzers 148 that can store or analyze the measured calibration pattern data so that the measured calibration pattern data can be sent to the controller 132. Various CMM instruments are available commercially that can measure objects, such as the target 118 having the calibration pattern 147 in the field of regard 122, with sub-micron measurement accuracy. Other non-CMM devices capable of providing highly accurate measurements can also be used.

Attaining an accurate correspondence to the nonlinear relationship between commanded and actual positions as described above can depend on a measurement accuracy of error differences between the expected positions of the processing beam 104 in the field of regard 122 and the actual positions of the processing beam 104 in the field of regard as measured by the CMM 142, and also depend one or more computational processes that codify or use the nonlinear relationship. For example, the scanning system 106 may be capable of high performance accuracy with high resolution but can be limited by the processing of error data. For the scanning system 106, a computational model is formed that maps positions in an object space (e.g., XY, Z, etc.) to the actuation of the scan optics, such as the mirror rotation angles of the mirrors 110, 112 provided by mirror actuators 114, 116. The computational model establishes a relationship that predictively adjusts scan optic actuation. For two-dimensional scanning examples, the model can describe a relationship that predictively adjusts angular rotation of the mirrors 110, 112 so that a chief ray 150 of the processing beam 104 intersects the target 118 at any corresponding commanded X,Y position in the coordinate frame of the field of regard 122. Typically, the computational model is an analytical one that incorporates the geometrical characteristics and other parameters of the mirrors 110, 112 and the dynamical response of the mirrors 110, 112, mirror actuators 114, 116, and other hardware dynamics of the scanning system 106 and latency or other timing dynamics associated with the command signal 134. Thus, the analytical model can have a physical basis in the scanning system 106 or other components of the laser system 100.

In typical examples, the mirror control correction table 140 is populated with separate bit values associated with separate X,Y positions across the field of regard 122 that correspond to the predictions of the analytical model. In some examples, the mirror control correction table 140 is populated with values corresponding to one or more arbitrary functions. The mirror control correction table 140 can also include bit correction values, separate from or combined with the bit values associated with the analytical model or arbitrary function, so that the bit values in the mirror control correction table 140 are adjusted based on the error differences between the data measured by the CMM 142 and the commanded positions of the processing beam 104. Thus, tables of calibration offsets can be maintained for each of mirror 110, 112 or other scan optics of the scanning system 106. In typical examples of the scanning system 106, bit correction values correspond to encoder bit values for the mirror actuators 114, 116 or other scan optic actuators. In one embodiment, bit correction values correspond to values that modify a linear arrangement of X,Y positions, or nodes, of the processing beam 104 at the target 118. Thus, spatial coordinates for the expected position of the processing beam 104 (e.g., in unit of length, such as mm) can be associated with bit quantities that alter a linear actuation table. As distortions associated with the scan optics such as the mirrors 110, 112 or other components of the laser system 100, including mechanical tolerances and fatigue of system components, the mirror control correction table 140 can be updated based on various physical assumptions. Additionally, one or more calibration processes can be performed, such as with the CMM 142 and the calibration pattern 147, to determine errors and corresponding offsets that reduce or eliminate the errors during actual processing of application targets with the processing beam 104. In some examples, scan optic control resolutions can permit accuracy for the processing beam 104 at the target 118 of 0.3 μrad, which can correspond to 0.5 μm at a 500 mm working distance.

In examples of the laser system 100 herein, the mirror control correction table 140 is modified based on a characterization of the mirror control correction table 140 that produced positional errors for the processing beam 104 at the target 118. While the mirrors 110, 112 have not directed the processing beam 104 correctly and have left a corresponding beam positional error, the actual positions of the processing beam 104 taken in aggregate across the field of regard 122, embody the response dynamics of the scanning system 106 and other components of the laser system 100, including mechanical tolerances and manufacturing errors, at the resolution of the CMM 142 or other measurement system used to determine the positional error and calibrate the scan optics of the scanning system 106.

The characterization can be obtained by numerically differentiating one or more sets of values of the mirror control correction table 140, such as the actuation bit correction values associated with the various X,Y positions in the field of regard 122. In further examples, the differentiation can be performed on one or more functions corresponding to the analytical model describing the scanning system 106 or to the actuation bit correction values that produced the positional error, such as a polynomial or curve-fit polynomial. The MCU 138 can perform numerical differentiation or an external computing device can also be used to determine derivative values. Derivative values can correspond to actuation rates, for example, in bits/mm, across the field of regard 122 and the mirror control correction table 140 can be updated to include the derivative values.

With the actuation rate values determined across the field of regard 122, for example, at a plurality of evenly spaced nodes corresponding to a grid arrangement, the beam positional errors between the nodal positions and the positions measured by the CMM 142 can be converted to mirror actuation bits by multiplying derivative values in bits/mm by positional error values in mm. The actuation corrections provided by the mirror control correction table 140 can be updated with the converted mirror actuation bits so that subsequent beam scanning operation of the laser system 100 with the pattern command 136 is more accurate. In general, corrections can be provided without particular assumptions about the underlying error mechanisms or scan optic geometry. In some examples, further calibration iterations can be performed so that the mirror control correction table 140 can be updated based on additional measurements, errors, functions, and derivatives, descriptive of system dynamics and mechanical tolerances. Subsequent updates can produce convergence on a zero or minimum positional error across the field of regard 122. With the actuation rates provided and having a physical basis in the dynamics of the scanning system, the nodal density of the mirror control correction table 140 can be selected to be relatively sparse while still providing superior scanning accuracy at submicron and sub-μrad resolutions at the corresponding nodes and interpolated across the inter-nodal areas.

The minimum size of the spot 130 of the processing beam 104 can be defined by the type of laser source 102 that is used in the laser system 100. In some examples, the laser source 102 includes a gain medium 152, such as an optical fiber oscillator, solid state gain block, laser diode source, etc., and a pump source 154, such as one or more laser diode modules, fiber oscillators, electrical sources, etc. The laser source 102 can operate in one or more modes, such as pulsed, continuous-wave, quasi-continuous wave, etc., and typically receives a laser command signal 156 associated with the laser pattern command 136. With the command signal 134, the scanning system 106 directs the processing beam 104 generated based on the laser pattern command 136 to form the calibration pattern 147 (or another laser pattern) that can include focused, unfocused, or variably focused laser marks, holes, or other features at discrete locations at the target 118. In some examples, the CMM 142 is coupled to the translation stage 124 so that the calibration pattern 147 on the target 118 can be moved relative to the field probe 144.

In representative examples, the differences between the measurement positions of the calibration pattern 147 and the expected positions of the calibration pattern 147 (e.g., the commanded locations) are curve fitted to a high order two dimensional polynomial or other surface function configured to represent or describe the data. In one example, a ninth order polynomial is used. In other examples, higher or lower order polynomials can be used depending on the quality of fit to the difference data. Actuator correction values in the mirror control correction table 140 that were used to create the calibration pattern 147 are curve fitted to a differentiable, low order polynomial. In one example, a fifth order polynomial is used in association with a slow response variation of the mirrors 110, 112 across the field of regard 122. In other examples, higher or lower order polynomials can be used and can depend on the response characteristics of the scan optics, such as the mirrors 110, 112, mirror actuators 114, 116, or other components of the scanning system 106 or laser system 100. Use of the low order polynomial also allows a reduction in the density of measurements or nodes associated with the calibration pattern and can substantially reduce calibration time.

Figure 2:
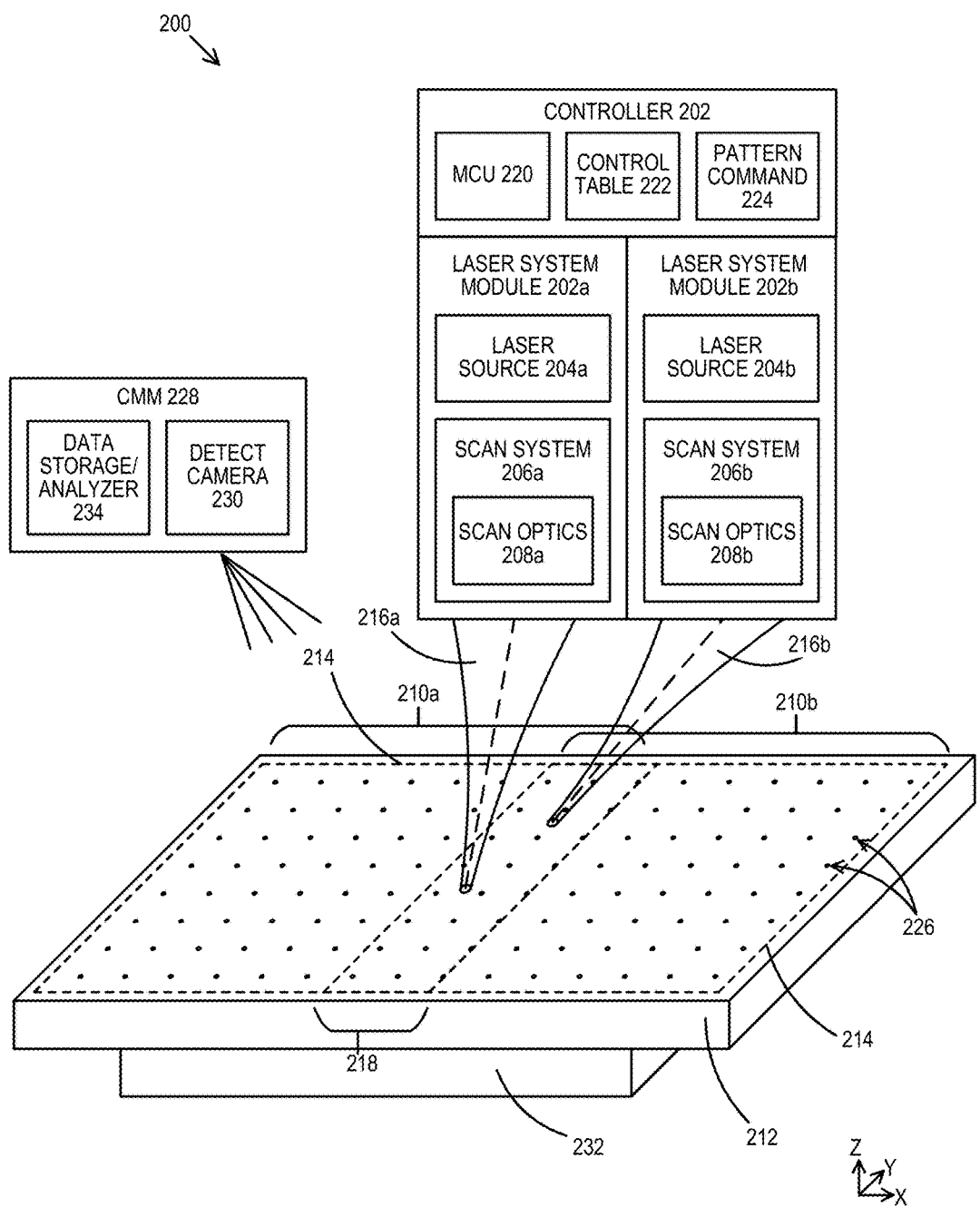
FIG. 2 illustrates a schematic of another example of a calibratable laser system with multiple sub-fields.

In FIG. 2, a laser system 200 includes a controller 202 coupled to a plurality of laser system modules 202a, 202b. The laser system modules 202a, 202b include respective laser sources 204a, 204b and scanning systems 206a, 206b. The scanning systems 206a, 206b include respective scan optics 208a, 208b that define respective adjacent scan fields 210a, 210b extending across respective fields of view of the scan optics 208a, 208b at a laser processing target 212 and that define a corresponding field of regard 214 over which respective laser beams 216a, 216b can be scanned. The scan fields 210a, 210b are typically defined in relation to a global coordinate system associated with the field of regard 214. In some examples, the adjacent scan fields 210a, 210b of can overlap at an overlap portion 218. In further examples, the adjacent scan fields 210a, 210b share an adjoining boundary. While the two scan fields 210a, 210b, other embodiments can include additional scan fields including on various adjacent relationships, including linear, quadrangular, etc.

The controller 202 includes a microcontroller unit (MCU) 220 or another computer processing unit that is coupled to the laser system modules 202a, 202b so as to coordinate control over the generation of the laser beams 216a, 216b by the laser sources 204a, 204b and over the related directing of the laser beams 216a, 216b in the field of regard 214 so as to process the target 212. The MCU 220 is coupled to a control table 222 that stores scan optic actuation correction data that correct positions of the respective laser beams 216a, 216b at the surface of the target 212. In representative examples, the control table 222 stores an initial set of scan optic actuation corrections that can correspond to an analytical or heuristic model describing the response characteristics of the scan optics 208a, 208b along with other components of the laser system 200 as the laser beams 216a, 216b are commanded with a laser patterning command 224 and scanned across the scan fields 210a, 210b.

A calibration pattern 226 can be formed on the target 212 based on the initial set of scan optic actuation corrections in the control table 222. The calibration pattern 226 will be produced such that a positional error can exist between the actual position of the features of the calibration pattern 226 produced by the laser beams 216a, 216b and the expected position of the features of the calibration pattern 226 that correspond to the laser patterning command 224. A CMM 228 can be coupled to the calibration pattern 226 on the target 212 so as to measure the position of the features of calibration pattern 226 with a detection camera 230 so as to detect the positional error. In some examples, the detection camera 230 can be scanned across the target 212, and in further examples, a translation stage 232 is used to move the target 212 in view of the detection camera 230. The CMM 228 can store and/or analyze the measured position data associated with the calibration pattern 226 in a data storage/analyzer 234. The CMM 228 can be coupled to the controller 202 or other external computing device to send the position data for further use and modification.

In representative examples, the controller 202 can store the measured position data for the calibration pattern 226 in the control table 222 and can determine a curve fit to the position error data, such as with a high order polynomial. The controller 202 can also compare the measured position data with the expected position data corresponding to the laser pattern command 224 that produced the calibration pattern 226 so as to determine a positional difference or error. The controller 202 can also differentiate a surface function (e.g., a polynomial) fitted to the initial set of scan optic actuation corrections and store the corresponding differentiated scan optic actuation rates in the control table 222. It will be appreciated that various calculations, algorithms, and stored tabular data, including differentiation, curve fits, and position and actuation data can also be stored and/or manipulated with one or more computing devices external to the controller 202. The initial scan optic actuation corrections in the control table 222 can be updated with scan optic actuation corrections corresponding to the scan optic actuation rates multiplied by the position errors. The updated control table 222 will provide improved scanning accuracy for the laser beams 216a, 216b across the field of regard 214, including in the overlapping portion 218 or boundaries between the scan fields 210a, 210b such that laser processing can occur seamlessly across the field of regard 214. Additional accuracy improvements can be achieved with further iterations of calibration pattern formation, detection, and data fitting, differentiation, and update.

Figure 3:
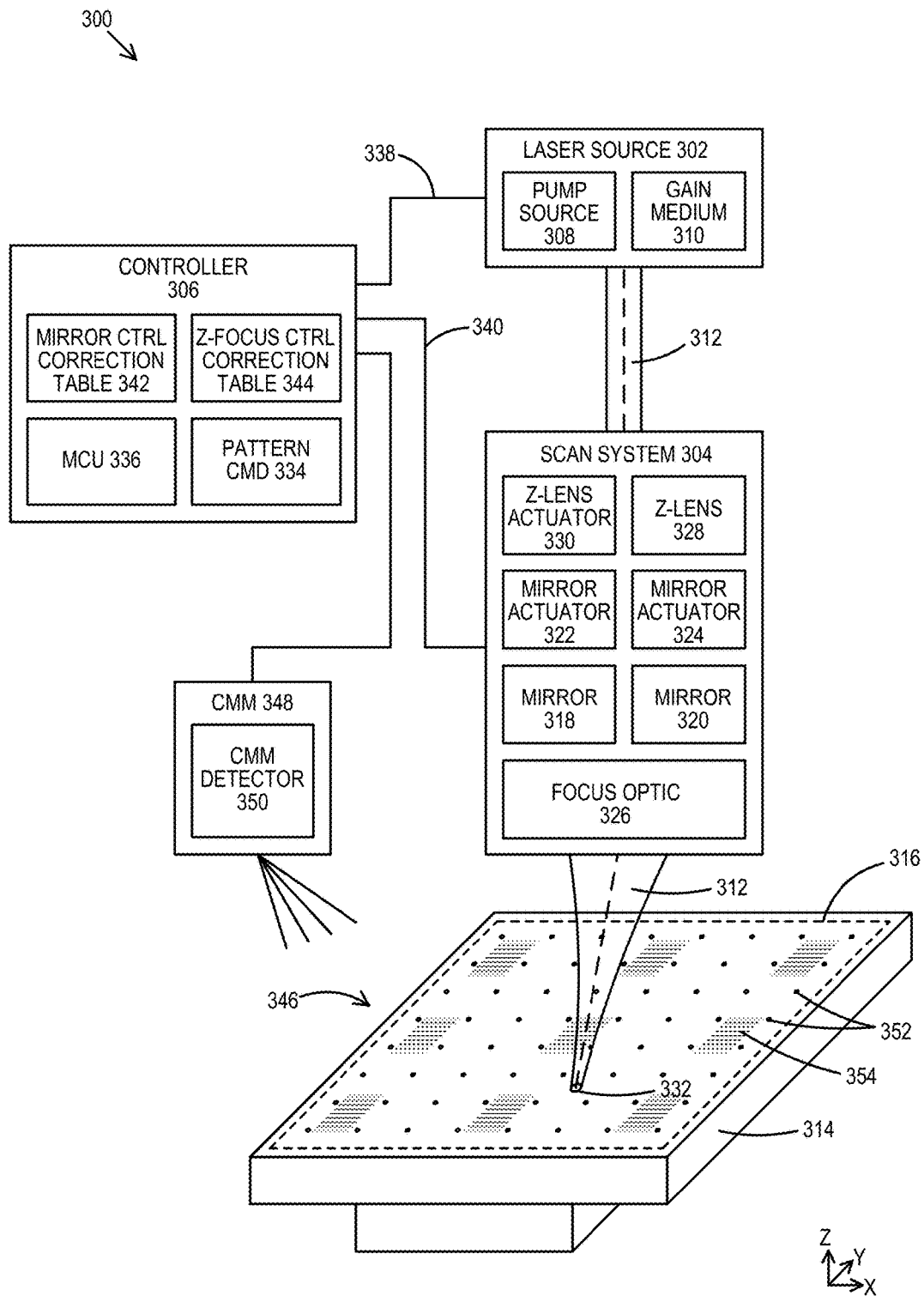
FIG. 3 illustrates a schematic of another calibratable laser system example.

FIG. 3 shows an example of a laser system 300 that includes a laser source 302 coupled to a 3D scan system 304 and a controller 306. The laser source 302 includes a pump source 308 and a gain medium 310 coupled to the pump source 308 that generates a laser beam 312 based on the energy provided by the pump source 308. The scan system 304 receives the laser beam 312, e.g., through free-space or optical fiber coupling, and directs the laser beam 312 to a target 314 situated in a field of view 316 of the 3D scan system 304. The 3D scan system 304 includes a pair of galvanometer scan mirrors 318, 320 optically coupled to the laser beam 312 and coupled to a pair of respective mirror actuators 322, 324 that rotate the scan mirrors 316, 318 so as to direct the laser beam 312 to through a focus optic 326 to an X,Y position in the field of view 316. The 3D scan system 304 also includes a Z-lens 328 and that is also optically coupled to the laser beam 312 and translates with a coupled Z-lens actuator 330 so as to a change the focal plane of a spot 332 of the laser beam 312 that is focused with the focus optic 326. For example, the focus optic 326 can be selected so as to have a relatively flat focal plane across the field of view 316, though improved flatness can increase the cost of the lens. Furthermore, the degree of flatness of the focus optic 326 can vary from optic to optic, or can remain substantially flat in a center region of the field of view 316 and deteriorate towards the edges of the field of view 326. Thus, the Z-lens 328 can be used to maintain the flatness of the focal plane across the field of view 316 or can enlarge the field of view capability of the focus optic 326. Additionally, some laser targets may include variable surface topologies that require a dynamic change in the z-position of the focal plane during processing or between processing steps with the laser beam 312.

The controller 306 is coupled to the laser source 302 and the scan system 304 so as to coordinate generation and direction of the laser beam 312 based on a laser pattern command 334 so as to laser pattern the surface of the target 314. The controller 306 typically includes an MCU 336 or another controller device (e.g., PLC, CPLD, ASIC, FPGA, etc.) situated to send a laser source signal 338 and a scan actuation signal 340 corresponding to the laser pattern command 334. The controller 306 also includes a mirror control correction table 342 and a z-focus control correction table 344 that includes scan actuator correction values for the mirror actuators 322, 324 and z-lens actuator 330 so that the laser beam 312 can be directed to the target 314 such that the position of the laser beam 312 accurately corresponds to the laser pattern command 334.

In representative embodiments, the mirror and z-focus control correction tables 342, 344 include initial sets of actuation corrections that correspond to respective analytical models of scan optic response dynamics across the field of view 316. For example, nonlinearities in the angular movement of the mirror actuators and focal field variation associated with the optical design of the focus optic 326 can be modeled to produce values that can populate X,Y,Z nodal positions in the tables 342, 344 that correspond to respective positions in the field of view 316. A calibration pattern 346 can be formed on the target 314 with the laser pattern command 334 and the features of the calibration pattern 346 can be measured with a CMM 348 that scans the surface with a CMM detector 350. Features can generally include laser marks, holes, etc. In some examples, calibration pattern features can include linearly spaced grid features 352 for X,Y positions and measurements by the CMM 348 can determine positional offset or error in X and Y. For Z positions, linearly spaced grid features 354 at various focal distances can be used that have corresponding varying levels of out of focus blur and feature size and darkness variation. Focus errors can be discerned and quantified based on the predetermined features 354 of the calibration pattern that are formed above and below the target focus plane. Thus, the measured positions and feature sizes can be sent to the controller 306 and a X,Y position error and Z position error can be determined by comparing the measured positions and sizes with the expected positions and the size of the spot 332 which are defined by the pattern command 334. In typical examples, one or more features 354 can also be used as features 352 so that measurements associated with X,Y positions and Z positions can be performed separately or concurrently.

The initial sets of actuation corrections for the mirror actuators 322, 324 and the z-lens actuator 330 can be fitted to respective parametric differentiable polynomial approximations. Derivative functions of the polynomial approximations corresponding to the initial sets can be obtained and used with the position errors to determine updated sets of actuation corrections that can be stored in the respective mirror and z-focus control correction tables 342, 344. The updated sets of actuation corrections are typically bit values that produce more accurate positions during scanning of the laser beam 312 for both the X,Y positions and Z positions of the spot 332 in the field of view 316 so as to conform to the expected positions of the laser pattern command 334. In typical examples, trace accuracy for the laser beam 312 of a few microns or less can be achieved for a variety of patterning applications.

Figure 4:
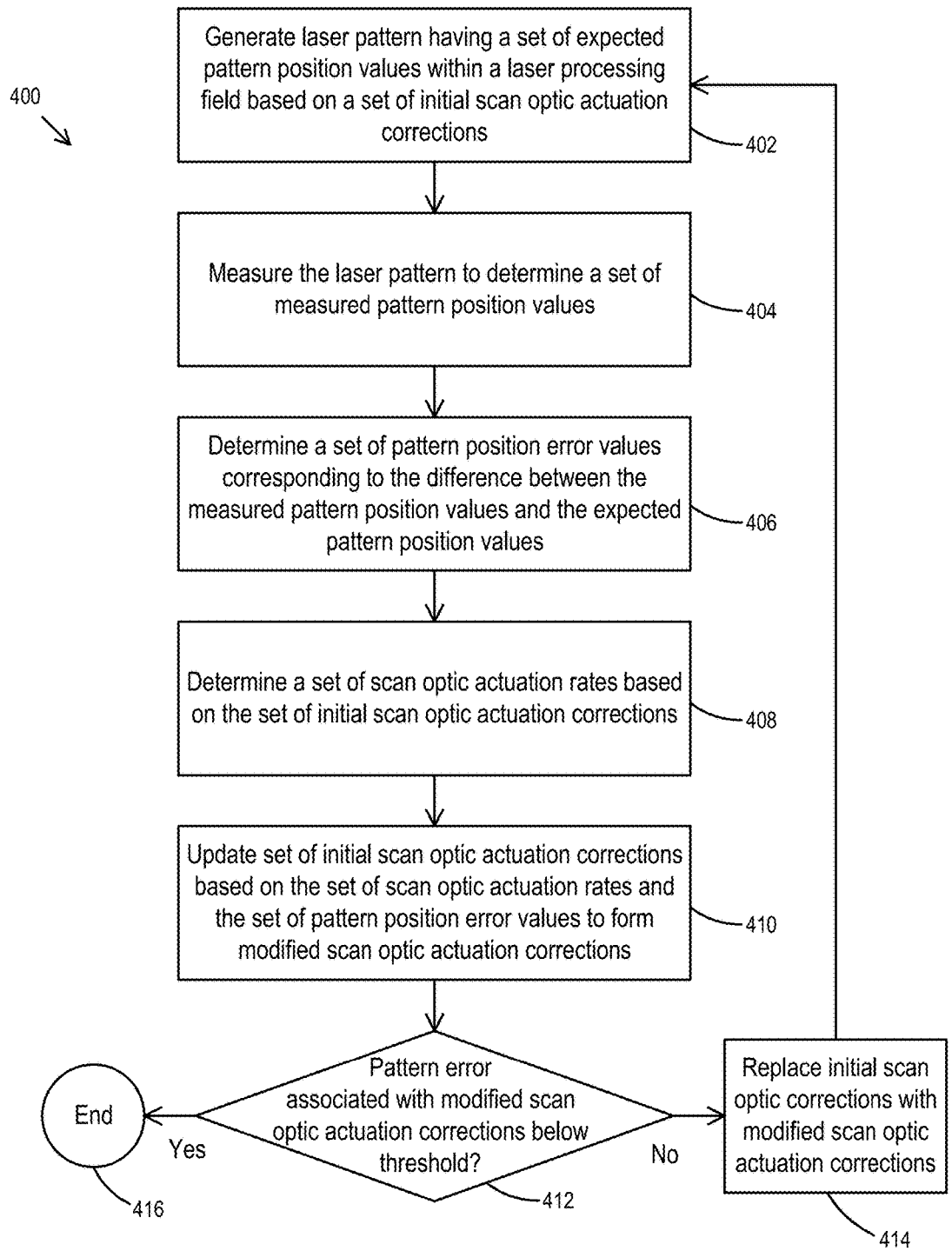
FIG. 4 is a flowchart of an example calibration method.

FIG. 4 shows an example calibration method 400 for a laser system that includes, at 402, generating a laser system calibration pattern with a laser beam generated and scanned by the laser system based on a laser patterning command. The calibration pattern produced according to the laser patterning command includes pattern features that correspond to a set of expected pattern position values and is produced using a set of initial scan optic actuation corrections associated with the scanning of the laser beam. At 404, the features of the calibration pattern are measured so as to determine a set of measured pattern position values. From a difference between the measured values and the expected values, at 406, a set of pattern position error values is determined. At 408, a set of scan optic actuation rates is determined through differentiation of the set of initial scan optic actuation corrections. In some examples, the set of error data and the set of initial scan optic actuation corrections and corresponding scan optic actuation rates can be fit to polynomial approximations. At 410, the set of initial scan optic corrections can be updated to form a modified set of scan optic actuation corrections based on the set of scan optic actuation rates and the set of position error values, e.g., through multiplication of the errors and rates and adding the products to the initial corrections. At 410, the modified scan optic actuation corrections can be compared against an error expectation threshold and if the threshold is not exceeded, the updated scan optic actuation corrections can be used for the scanning the laser beam with the laser system and the calibration can end at 416. If the threshold is not exceeded or if a subsequent calibration is desired to further refine the updated scan optic actuation corrections, the initial scan optic corrections can be replaced with the modified scan optic actuation corrections and the calibration method can be repeated at 414.

Figure 5:
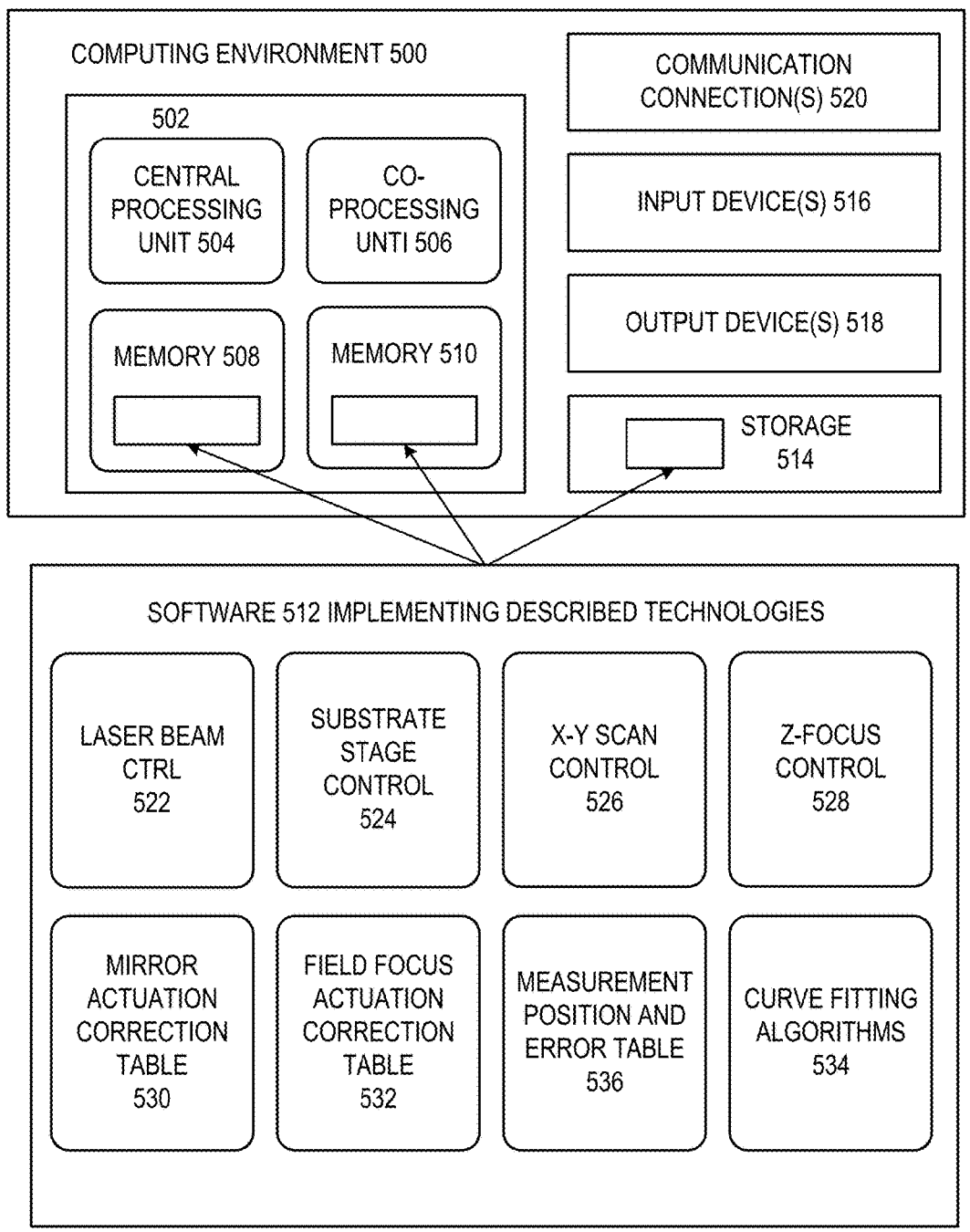
FIG. 5 is a schematic of an example computing environment.

FIG. 5 shows a representative computing environment 500 which can implement method steps and algorithms described herein for laser systems and laser system modules and components. The computing environment 500 is shown in general form and is not intended to suggest a limitation on any specific use or functionality, as various examples or portions of examples herein can be implemented in general purpose or special purpose computing systems, including desktop computers, tablet computers, mobile devices, MCUs, PLCs, ASICs, FPGAs, CPLDs, etc. The computing environment 500 includes a core grouping of computing components 502 that includes one or more processing units 504, 506 and memory 508, 510. In some examples, processing units can be configured based on RISC or CSIC architectures, and can include one or more general purpose central processing units, application specific integrated circuits, graphics or co-processing units or other processors. In some examples, multiple core groupings of computing components 502 can be distributed among laser system modules, and various modules of software 512 can be implemented separately on separate laser modules.

The memory 508, 510 can be volatile memory (e.g., registers, cache, RAM), non-volatile memory (e.g., ROM, EEPROM, flash memory, etc.), or a combination of volatile and non-volatile memory. The memory 508, 510 is generally accessible by the processing units 504, 506 and can store the software 512 in the form computer-executable instructions that can be executed by the one or more processing units 504, 506 coupled to the memory 508, 510. The computing environment 500 can also include storage 514, input and output devices or ports 516, 518, and communication connections 520. The storage 514 can be removable or non-removable and include magnetic media, CD-ROMS, DVDs, or any other medium that can be used to store information in a non-transitory way and which can be accessed within the computing environment 500. In typical examples, the storage 514 can store instructions for the software 512 implementing one or more method steps and algorithms described herein.

Input and output devices and ports 516, 518 can include laser scanning systems, laser sources, coordinate measurement machines, etc. Various interconnections can be included, such as one or more buses, controllers, routers, switches, etc., that can couple various components of the computing environment 500 and laser system components together, such as laser beam generation and scanning components, including actuators, detectors, power supplies, etc. The communication connections 520 and the input and output ports 516, 518 enable communication over a communication medium to various laser system components, including other laser system computing devices, and external system components and computing devices. The communication medium, such as electrical, optical, RF, etc., can convey information such as computer-executable instructions, laser pattern signals, laser generation signals, laser beam scanning signals, feedback detection and monitoring signals, or other data in a modulated data signal. A modulated data signal can include signals having one or more of characteristics (e.g., frequency, amplitude, duty cycle, etc.) set or changed so as to encode information in the signal.

The software 512 can include one or more software modules or programs, including laser beam generation software module 522 that can provide various settings associated generation and control of the laser beam of the laser system, including pulse and repetition rate control by way of example and correspondence with a laser patterning command. A substrate stage movement module 524 can be used to control movement of a substrate stage that can move a laser target in relation to a field of view of scanning components of the laser system. An X-Y scan control module 526 can be used to control scanning of the laser beam to various X,Y positions in a field of regard associated with the scanning system. In typical examples, a dual-mirror galvanometer scanner is used. A z-focus control module 528 can be used to control the focal plane of the laser beam at various X,Y positions in the field of regard. In typical examples, the scanning system includes a z-focus adjust lens that can be translated to change the focus position of the laser beam in the field of regard. A mirror actuation correction table 530 includes modifiable values that are associated with directing the laser beam to the target at an expected X,Y position in the field of regard. Similarly, a field focus actuation correction table 532 includes modifiable values that are associated with directing the laser beam to the target at an expected focal plane Z position in the field of regard. A measurement position and error table 534 can also be provided that stores values associated with measurements of calibration patterns and detected positional errors. Curve fitting algorithms 536 can determine various parametric functions and their derivatives that fit values in the various tables of the software 512. Algorithms can include polynomial regression and interpolation, and approaches can include least squares, Newtonian, Gauss-Newton, etc. The various algorithms herein may be, for example, embodied as software or firmware instructions carried out by a digital computer or controller.

Figure 6A:
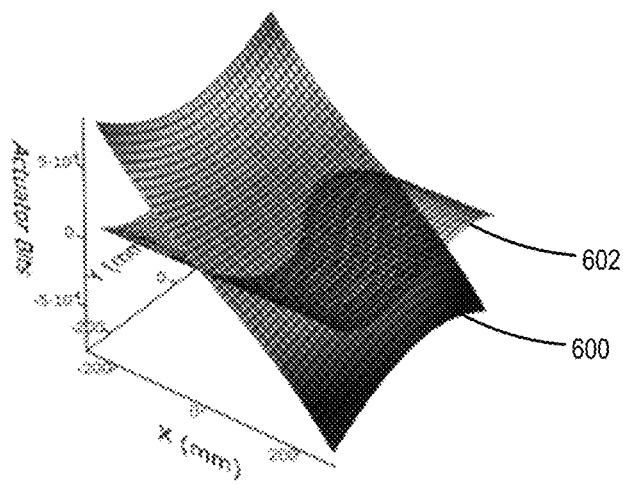
FIGS. 6A-6B show graphs of an actuation corrections and actuation correction rates, respectively.
Figure 6B:
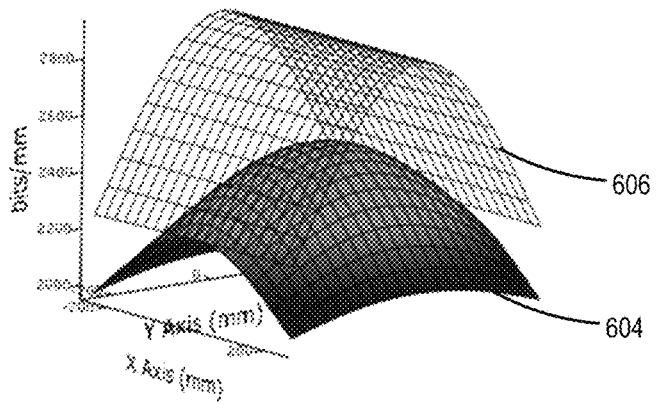
Figure 6C:
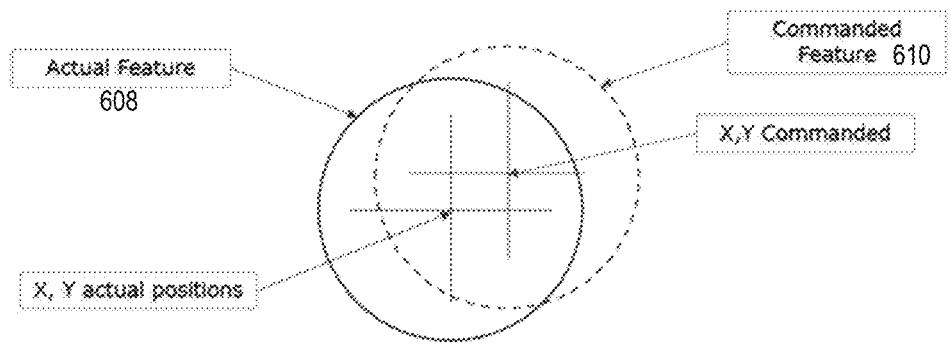
FIG. 6C shows a plan view of a laser calibration target.

FIG. 6A shows functional representations 600, 602 of X axis mirror actuation correction values and Y axis mirror actuation correction values. Each of the X,Y field points has an associated correction value in bits applied uniquely for X and Y positions in mm. FIG. 6B shows a functional representations 604, 606 of differentiated versions of the functional representations 600, 602 so as to illustrate actuation correction rates associated with the X axis and Y axis actuation correction tables. FIG. 6C illustrates an example laser patterned calibration feature 608 and an adjacent location 610 corresponding to where the calibration feature 608 is expected to be produced based on a laser command that produced the calibration feature 608. A coordinate measurement machine can be used to measure the offset so as to determine a position error.

Figure 7A:
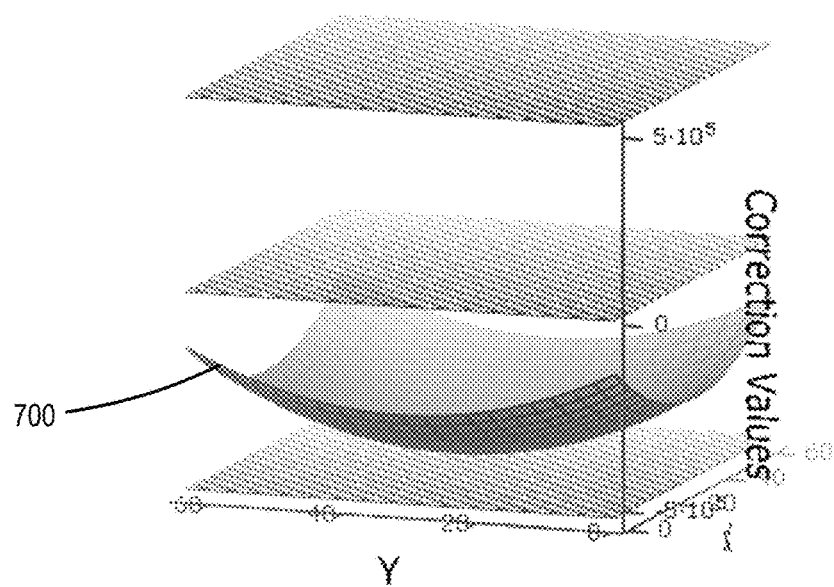
FIGS. 7A-7B show graphs of actuation corrections and actuation correction rates, respectively.
Figure 7B:
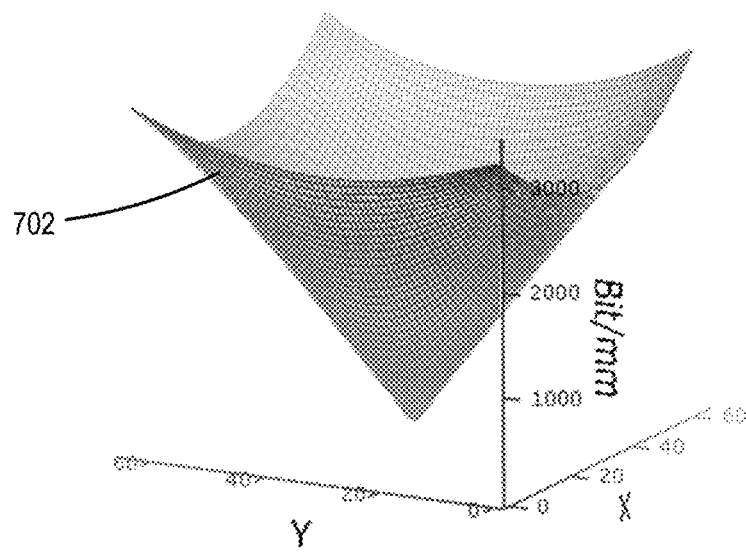

FIG. 7A shows a functional representation 700 of z-focus correction values that control a z-focus lens linear motion so as to flatten a focal plane. The curved shape of the functional representation 700 is associated with a variation in the focus distance changes across the X,Y positions of a field of regard. An offset from a zero value generally indicates a focus shift for the entire field of regard according to an error in a working distance for a laser beam that is scanned. FIG. 7B is the derivative function representation 702 corresponding to the functional representation 700. The center of the field of regard can be selected as Z=0 because the change from center focus is zero at the same location.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
a laser source situated to generate at least one process beam;
a scan system situated to receive the process beam and including one or more scan optics situated to direct the process beam to a position in a laser processing field associated with a target; and
a controller coupled to the laser source and scan system and situated to direct the process beam in the laser processing field based on a set of scan optic actuation corrections;
wherein the set of scan optic actuation corrections are determined from:
(a) a set of scan optic actuation rates associated with a set of initial reference scan optic actuation corrections stored in the controller, and
(b) a set of pattern position errors, wherein the set of pattern position errors corresponds to a difference between:
(i) a set of expected pattern positions, and
(ii) a set of measured pattern positions, wherein the set of measured pattern positions corresponds to process beam positions produced with the set of initial reference scan optic actuation corrections.

2. The apparatus of claim 1, wherein the controller includes at least one processor and one or more computer-readable storage media including stored instructions that, responsive to execution by the at least one processor, cause the controller:
to compare the set of measured pattern positions to the set of expected pattern positions to determine the set of pattern position errors,
to curve fit the set of pattern position errors to a first function and to curve fit the set of initial reference scan optic actuation corrections to a second function, and
to modify the set of initial reference actuation corrections based on the first function and a derivative function of the second function, wherein the derivative function corresponds to the set of scan optic actuation rates.

3. The apparatus of claim 1, wherein the set of initial reference scan optic actuation corrections corresponds to an analytical system model that includes laser scanning system dynamics associated with the one or more scan optics.

4. The apparatus of claim 1, wherein the set of initial reference scan optic actuation corrections corresponds to a set of scan optic corrections obtained based on a previous calibration that determined a prior set of pattern position errors and a prior set of scan optic actuation rates.

5. The apparatus of claim 1, wherein the one or more scan optics includes a pair of galvanometer scan mirrors and the scan optic actuation corrections correspond to respective mirror-rotation angles that direct the process beam to respective X and Y coordinates in the laser processing field of the laser system.

6. The apparatus of claim 1, wherein the one or more scan optics includes a translatable Z-axis lens and the scan optic actuation corrections correspond to a Z coordinate position of a focal plane of the process beam in the laser processing field of the laser system.

7. The apparatus of claim 1, wherein the field includes a plurality of adjacent scan fields and wherein the at least one process beam includes separate process beams that are directed into the respective scan fields with the scan system.

8. The apparatus of claim 1, wherein the set of scan optic actuation rates corresponds to a spatial derivative function.

9. The apparatus of claim 2, wherein the first function has a polynomial order of six or greater and the second function has a polynomial order of four or greater.

10. The apparatus of claim 7, wherein the adjacent scan fields include an overlapping portion wherein an expected position of a first process beam of the separate process beams corresponds to an expected position of a second process beam of the separate process beams in the overlapping portion.

11. The apparatus of claim 1, wherein the target includes a calibration pattern formed on a surface of the target that includes pattern features produced according to the set of expected pattern positions.

12. The apparatus of claim 11, further comprising a coordinate measuring machine coupled to the calibration pattern so as to determine the set of measured pattern positions.

13. An apparatus, comprising:
a laser source situated to generate at least one process beam;
a scan system situated to receive the process beam and including one or more scan optics situated to direct the process beam to a position in a laser processing field associated with a target;
a coordinate measurement machine operable to measure actual beam positions of the process beam in the laser processing field; and
a controller coupled to the laser source, to the scan system, and to the coordinate measurement machine, the controller being operable to cause the apparatus to:
generate a first laser pattern by scanning the process beam to a first set of expected pattern positions, the scanning being based on a set of initial reference scan optic actuation corrections,
measure the first laser pattern to determine a set of measured pattern positions;
determine a set of pattern position errors, the pattern position errors corresponding to the differences between the set of measured pattern positions and the first set of expected pattern positions,
determine a set of scan optic actuation rates corresponding to a spatial derivative of a surface function that describes the set of initial reference scan optic actuation corrections, and
modify the initial reference set of scan optic actuation corrections, based on the set of scan optic actuation rates and the set of pattern position errors, to form a modified set of scan optic actuation corrections associated with a reduced scan position error.

* * * * *